United States Patent
Ishiguro et al.

(10) Patent No.: US 7,720,478 B2
(45) Date of Patent: May 18, 2010

(54) CONTROL DEVICE OF MOBILE COMMUNICATION SYSTEM

(75) Inventors: Takayuki Ishiguro, Yokosuka (JP); Mayu Yamada, Yokohama (JP); Sung Uk Moon, Yokosuka (JP); Hiroyuki Ishii, Yokosuka (JP); Toshiyuki Futakata, Yokosuka (JP); Tomohiro Dohi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 636 days.

(21) Appl. No.: 10/395,088

(22) Filed: Mar. 25, 2003

(65) Prior Publication Data

US 2004/0203786 A1     Oct. 14, 2004

(30) Foreign Application Priority Data

Mar. 26, 2002    (JP)    ............... 2002-086613

(51) Int. Cl.
*H04W 36/00*    (2009.01)
(52) U.S. Cl. .................. 455/436; 455/439; 455/440
(58) Field of Classification Search ................ 455/436, 455/428, 433, 456.1, 440, 466, 458, 439, 455/443; 342/357.03; 370/331, 445, 310, 370/281, 310.1
See application file for complete search history.

(56) References Cited

U.S. PATENT DOCUMENTS

| | | | |
|---|---|---|---|
| 5,669,061 A | 9/1997 | Schipper | |
| 5,884,169 A * | 3/1999 | Uchiyama et al. | 455/433 |
| 5,950,127 A * | 9/1999 | Nitta et al. | 455/428 |
| 6,122,512 A * | 9/2000 | Bodin | 455/440 |
| 6,249,245 B1 * | 6/2001 | Watters et al. | 342/357.03 |
| 6,263,203 B1 * | 7/2001 | Jahn | 455/436 |
| 6,278,697 B1 * | 8/2001 | Brody et al. | 370/310 |
| 6,327,471 B1 | 12/2001 | Song | |
| 6,570,856 B1 * | 5/2003 | Freeburg et al. | 370/310.1 |
| 6,609,003 B1 * | 8/2003 | Park et al. | 455/436 |
| 6,611,507 B1 * | 8/2003 | Hottinen et al. | 370/331 |
| 6,711,408 B1 * | 3/2004 | Raith | 455/440 |
| 6,738,634 B1 * | 5/2004 | Shin | 455/466 |
| 6,771,614 B1 * | 8/2004 | Jones et al. | 370/310 |
| 6,829,481 B2 * | 12/2004 | Souissi | 455/436 |
| 6,856,807 B1 * | 2/2005 | Raith | 455/456.1 |

(Continued)

FOREIGN PATENT DOCUMENTS

CN    1302518    7/2001

(Continued)

*Primary Examiner*—Thjuan K Addy
(74) *Attorney, Agent, or Firm*—Oblon, Spivak, McClelland, Maier & Neustadt, L.L.P.

(57) ABSTRACT

There is provided a control device enabling switching of communication of a mobile terminal with one system to communication with another system while reducing power consumption and workload of the mobile terminal. The control device is used in a communication system including a first mobile communication system, a second mobile communication system, and a mobile terminal being in communication with the first mobile communication system. The control device comprises a position measuring unit for measuring the position of the mobile terminal, a judgment unit for making a determination whether or not to switch the communication of the mobile terminal from the first mobile communication system to the second mobile communication system according to a position measurement result of the position measuring unit, and a switching unit for performing the above switching operation according to the determination of the judgment unit.

4 Claims, 7 Drawing Sheets

U.S. PATENT DOCUMENTS

| | | | |
|---|---|---|---|
| 7,277,451 B1 * | 10/2007 | Chen et al. | 370/445 |
| 2001/0043572 A1 * | 11/2001 | Bilgic et al. | 370/281 |
| 2002/0051432 A1 * | 5/2002 | Shin | 370/331 |
| 2002/0082017 A1 * | 6/2002 | Hattori | 455/436 |
| 2003/0108007 A1 * | 6/2003 | Holcman et al. | 370/331 |
| 2003/0109256 A1 * | 6/2003 | Holcman | 455/436 |
| 2005/0101333 A1 * | 5/2005 | Raith | 455/456.1 |
| 2009/0176516 A1 * | 7/2009 | Trott | 455/458 |

FOREIGN PATENT DOCUMENTS

| | | |
|---|---|---|
| EP | 1 081 974 | 3/2001 |
| GB | 2 362 297 | 11/2001 |
| JP | 2001-69548 | 3/2001 |
| JP | 2001-112041 | 4/2001 |
| JP | 2002-27519 | 1/2002 |
| JP | 2002-530030 | 9/2002 |
| JP | 2004-502363 | 1/2004 |
| WO | 00/28774 | 5/2000 |
| WO | WO 01/33890 | 5/2001 |
| WO | 02/01902 | 1/2002 |

* cited by examiner

FIG.5

| | PREVIOUS POSITION | PRESENT POSITION | TRANSMISSION MODE | INSTRUCTION |
|---|---|---|---|---|
| A | P1 | P1 | TDD | NO SWITCHING |
| B | P1 | P1 | FDD | SWITCH TO TDD |
| C | P2 | P1 | FDD | SWITCH TO TDD |
| D | P3 | P1 | TDD | SWITCH TO FDD |

| | PREVIOUS POSITION | PRESENT POSITION | TRANSMISSION MODE | INSTRUCTION |
|---|---|---|---|---|
| A | P1 | P1 | TDD | NO SWITCHING |
| B | P1 | P1 | FDD | SWITCH TO TDD |
| C | P3 | P1 | TDD | NO SWITCHING |
| D | P5 | P1 | TDD | NO SWITCHING |
| E | P5 | P1 | FDD | SWITCH TO TDD |
| F | P1 | P5 | TDD | SWITCH TO FDD |
| G | P1 | P5 | FDD | NO SWITCHING |
| H | P2 | P5 | FDD | SWITCH TO TDD |
| I | P5 | P5 | TDD | NO SWITCHING |
| J | P5 | P5 | FDD | NO SWITCHING |

700

CONTROL DEVICE OF MOBILE COMMUNICATION SYSTEM

BACKGROUND OF THE INVENTION

1. Field of the Invention

The present invention relates generally to the field of mobile communications, and more specifically to a control device enabling handover between mobile communication systems.

2. Description of the Related Art

The so-called IMT-2000 (International Mobile Telecommunications 2000) system is well known in the field of mobile communications, and is capable of meeting requirements of high-speed communications, for example, at 2 Mbps. There are two standardized transmission methods in IMT-2000 systems, one is IMT-2000/FDD (Frequency Division Duplex), and the other is IMT-2000/TDD (Time Division Duplex). FDD is capable of providing wide area services with symmetric traffic for downlink and uplink channels, and therefore is suited to data and speech transmission with lower data rate, such as 384 kbps. On the other hand, TDD is capable of dynamically varying the traffic of downlink and uplink channels, and is preferred for data transmission at higher data rates.

FIG. 1 shows a schematic view of a mobile communication system 100 including two sub-mobile communication systems each using one of the above two transmission methods. Specifically, the mobile communication system 100 shown in FIG. 1 includes an FDD base station 10 constituting an IMT-2000/FDD system, a TDD base station 20 constituting an IMT-2000/TDD system, and a mobile terminal 30 operable in either of the above systems.

The FDD base station 10 provides services in a service area 60 covering a certain geographical region, and is capable of transmission by the FDD transmission method in the area 60. Similarly, the TDD base station 20 provides services in a service area 70, and is capable of transmission by the TDD transmission method in the area 70. The FDD service area 60 and the TDD service area 70 are partially overlapped geographically, and in this overlapped area, communication by either of the above two modes is possible.

In FIG. 1, the symbol P1 indicates the overlapped common area of the service area 60 and the service area 70, symbol P2 indicates the area in the service area 60 other than the overlapped area P1, symbol P3 indicates the area in the service area 70 other than the overlapped area P1, and symbol P4 indicates the area outside of both the service area 60 and the service area 70. For example, if the mobile terminal 30 is situated in the area P2, it is capable of communication in the FDD mode only; if the mobile terminal 30 is located in the area P3, it is capable of communication in the TDD mode only; whereas, if the mobile terminal 30 is located in the area P1, it is capable of communication in both the FDD mode and the TDD mode. But, if the mobile terminal 30 is located in the area P4, that is, out of the service areas 60 and 70, it is incapable of communication in either mode.

Note that, for the sake of simplicity, only one FDD base station is shown in FIG. 1. In practice many FDD base stations are provided, and the corresponding areas of individual FDD base stations (called a cell or a sector) form the service area 60. Similarly, the service area 70 is formed by cells of many TDD base stations 20.

Each FDD base station 10 and TDD base station 20 is connected to a not-shown network through a control device and is controlled by the control device.

Consider the case in which the mobile terminal 30 is in the area P2 and is conducting data transmission with the FDD base station 10 at a relatively high data rate, and assume the mobile terminal 30 is moving to the area P1. In the area P1, as mentioned above, communications by both the FDD method and the TDD method are possible, and the TDD transmission method is advantageous to high-speed communication. Therefore, in the area P1, it is preferable for the mobile terminal 30 that is presently in the FDD mode to use the TDD resource to communicate if the TDD resource is available. To the contrary, if the mobile terminal 30 is transmitting at a lower data rate but in the TDD mode, when it is moved to the area P1, there is advantage to switching the mobile terminal 30 to the FDD mode. In other words, when the mobile terminal 30 is communicating by using one of the communication resources, if the terminal can be switched to the other mode when necessary, it is possible to realize a dual-mode mobile communication system superior in efficiency of resource utilization.

To realize a system like the mobile communication system 100, it has been proposed that the mobile terminal 30 operated in one sub-system constantly monitor a control signal from the other sub-system, and if the levels of the received signals are higher than a preset value, the mobile terminal 30 be switched to communication with the other sub-system. For example, the mobile terminal 30 is communicating with the FDD base station 10 in the area P2, while monitoring the levels of the received control signals from the TDD base station 20. Assume the levels of the received control signals are still lower than a preset value at the present position of the mobile terminal 30. If the mobile terminal 30 is moved to the area P1, the levels of the received control signals become higher than the preset value. If the mobile terminal 30 is transmitting data at a higher data rate, and if the TDD communication resource is available, the transmission mode of the mobile terminal 30 is switched to TDD mode.

In such a way, it is certain the mobile terminal 30 communicating by using one of the communication resources can be switched to the other system when necessary. If this method for system switching is adopted, however, transmitting and receiving devices for constantly monitoring the control signals from the other system are necessary in addition to those used for the communication conducted presently, and all these devices have to be operated in synchronization with each other. As a result, consumption of electric power increases greatly. In addition, the control signals have to be monitored constantly no matter whether the transmission mode of the mobile terminal needs to be switched or not, so, the electric power is wasted if system switching does not occur. To avoid installing two sets of transmitting and receiving devices, it is conceived to use only one set of transmitting and receiving devices, and this set of devices may be used alternatively temporarily. With such a configuration, however, in order to perform communication, the mobile terminal 30 has to precisely control timing of transmitting and receiving signals and the timing of receiving and measuring the control signals. But generally, timing control places a heavy workload on a mobile terminal. Accordingly, for a mobile terminal having to pay attention to power consumption, this method is not appropriate.

On the other hand, at the mobile terminal 30, the levels of the received control signals from a base station may vary largely because of the propagation path or the phase, and thereby, the levels of the received signals do not strictly depend on the distance to the base station. Therefore, sometimes system switching is actually not necessary or this switching is not actually possible even though the levels of the received signals are higher than the preset value. In this case, if such kind of switching is still carried out, this also leads to unnecessary power consumption.

SUMMARY OF THE INVENTION

Accordingly, it is a general object of the present invention to solve the above problems of the related art.

A more specific object of the present invention is to provide a control device able to switch communication of a mobile terminal communicating with one system to communication with the other system through appropriate control, while reducing power consumption and load of the mobile terminal.

To attain the above object, according to the present invention, there is provided a control device of a communication system including a first mobile communication system, a second mobile communication system, and a mobile terminal being in communication with the first mobile communication system by a first transmission method, and able to communicate with the second mobile communication system by a second transmission method, comprising a position measuring unit for measuring the position of the mobile terminal, a judgment unit for making a determination whether or not to switch the communication of the mobile terminal from the first mobile communication system to the second mobile communication system according to a position measurement result of the position measuring unit, and a switching unit for performing the switching operation according to the determination of the judgment unit.

Preferably, the control device further comprises a position data table including data for selecting one of the first mobile communication system and the second mobile communication system according to the position of the mobile terminal, wherein said judgment unit makes said determination by using the position data table.

Preferably, in the control device, the judgment unit makes the determination based on a change of the position of the mobile terminal.

Preferably, in the control device, a communication protocol upper layer of the physical layer of the first mobile communication system is at least partially the same as a communication protocol upper layer of the physical layer of the second mobile communication system.

According to the above invention, because the control device measures the position of the mobile terminal, the mobile terminal in communication with the first mobile communication system need not constantly monitor the control signal from the second mobile communication system, so power consumption of the mobile terminal can be reduced. In addition, by using the position data table that can be created in advance, appropriate determination for control of system switching of the mobile terminal can be made quickly. Compared with the method using the levels of the received signals, unnecessary system switching is avoidable. In addition, by taking into consideration changes of position of the mobile terminal, a detailed position data table can be created and system switching control can be performed appropriately in various situations.

Furthermore, because the first mobile communication system and the second mobile communication system have at least partially the same upper communication protocol layer, handover processing between two systems can be carried out smoothly. Different from the levels of the received control signals, position information does not depend on the types of the physical layers, so it is adequate to measure the position of the mobile terminal in the system in communication, and it is not necessary to measure the position of the mobile terminal for a physical layer of each of the two systems.

These and other objects, features, and advantages of the present invention will become more apparent from the following detailed description of the preferred embodiments given with reference to the accompanying drawings.

BRIEF DESCRIPTION OF THE DRAWINGS

FIG. 5 is an example of a position data table in a control device according to the first embodiment of the present invention;

FIG. 7 is an example of a position data table in a control device according to the second embodiment of the present invention.

DESCRIPTION OF THE PREFERRED EMBODIMENTS

Figure 1:
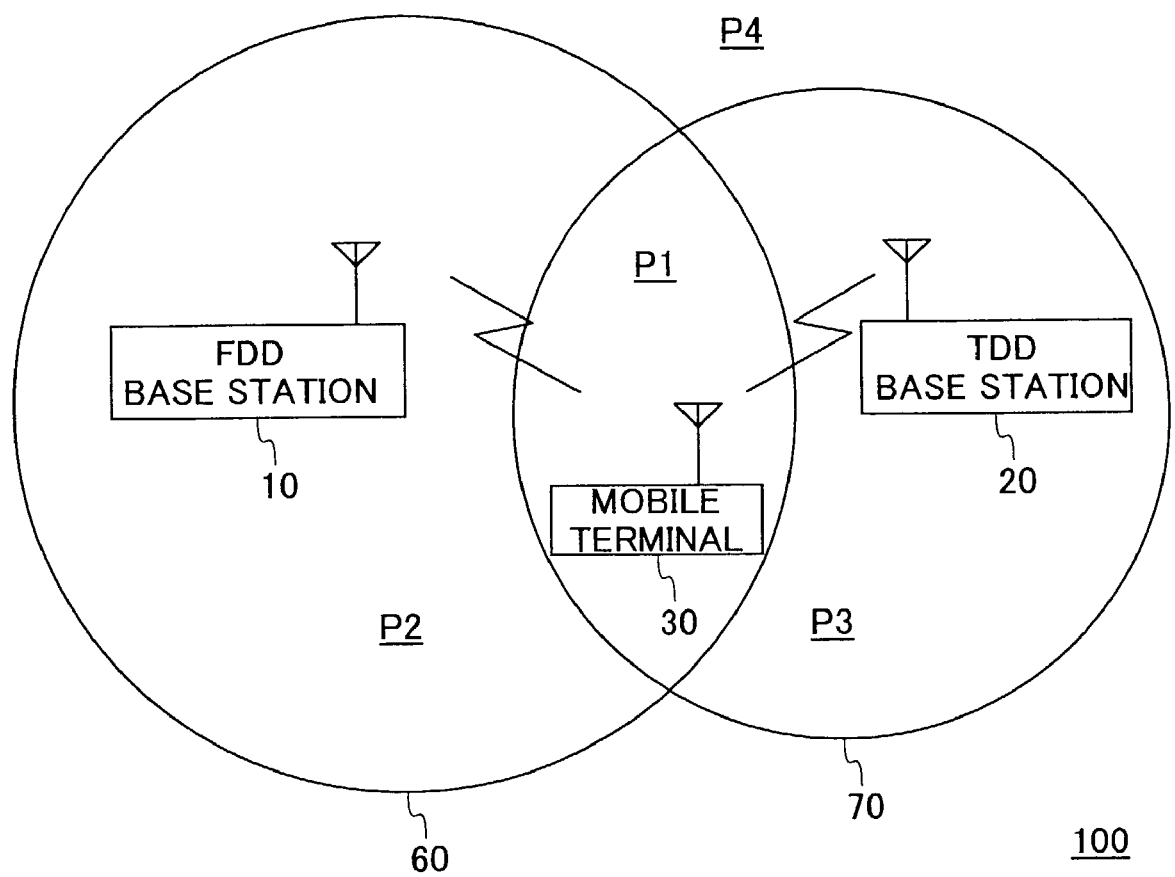
FIG. 1 is a schematic view showing a mobile communication system of the related art including two sub-mobile communication systems using different transmission methods.

Below, preferred embodiments of the present invention will be explained with reference to the accompanying drawings. Note that in the following explanations, the same reference numerals are used to represent the same elements.

The First Embodiment

Figure 2:
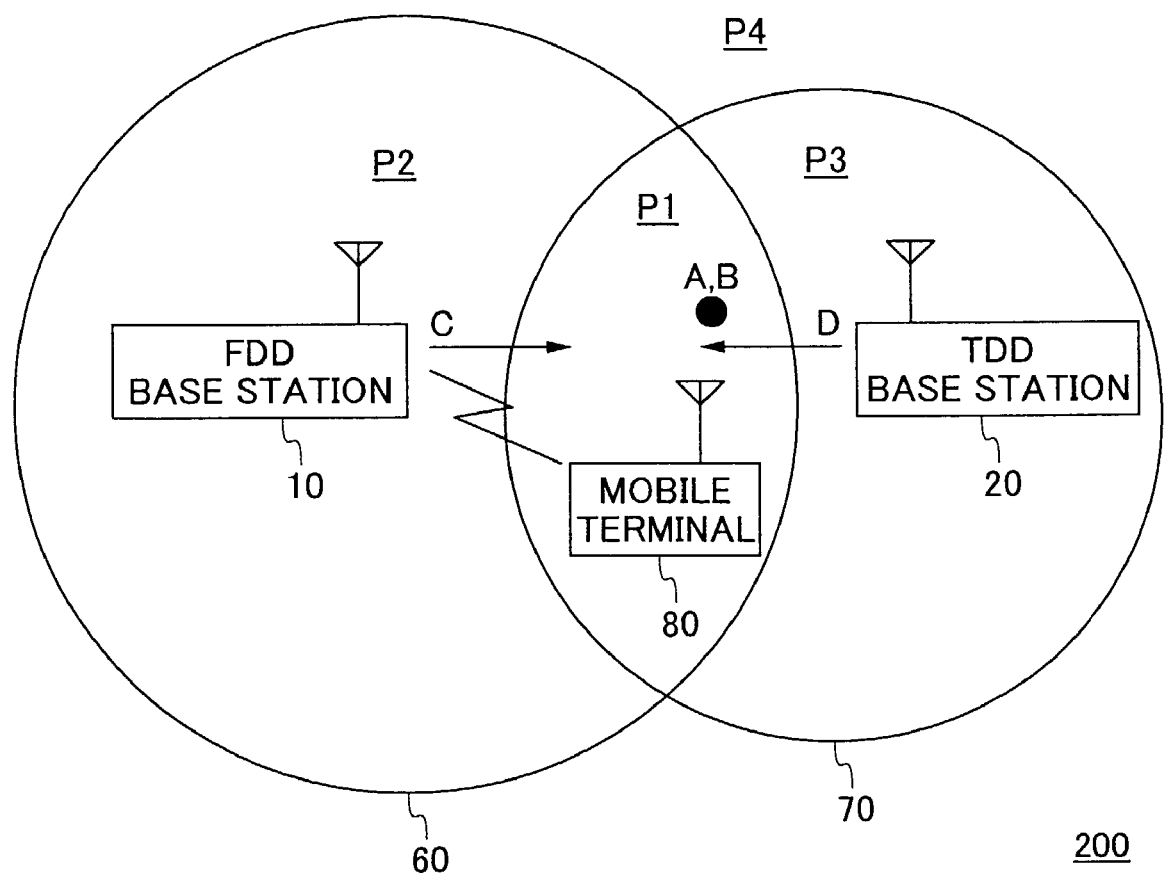
FIG. 2 is a schematic view showing a mobile communication system according to a first embodiment of the present invention.

FIG. 2 is a schematic view showing a mobile communication system 200 according to a first embodiment of the present invention. The basic configuration of the mobile communication system 200 shown in FIG. 2 is the same as that of the mobile communication system 100 shown in FIG. 1. That is, the mobile communication system 200 includes an FDD base station 10 constituting an IMT-2000/FDD system, a TDD base station 20 constituting an IMT-2000/TDD system, and a mobile terminal 80 operable in either of the above two systems. Similarly, the FDD base station 10 provides services in a service area 60 and the TDD base station 20 provides services in a service area 70. The FDD service area 60 and the TDD service area 70 are partially overlapped geographically. Further, in FIG. 2, P1, P2, P3 indicate the overlapped common area of the service area 60 and the service area 70, the area in the service area 60 other than the overlapped area P1, and the area in the service area 70 other than the overlapped area P1, respectively. P4 represents the area out of both the service area 60 and the service area 70.

For simplicity, only one FDD base station 10 and TDD base station 20 are shown in FIG. 2, although actually many FDD and TDD base stations are provided, and the service area 60 is formed by cells of these FDD base stations 10, and the service area 70 is formed by cells of these TDD base stations 20.

Figure 3:
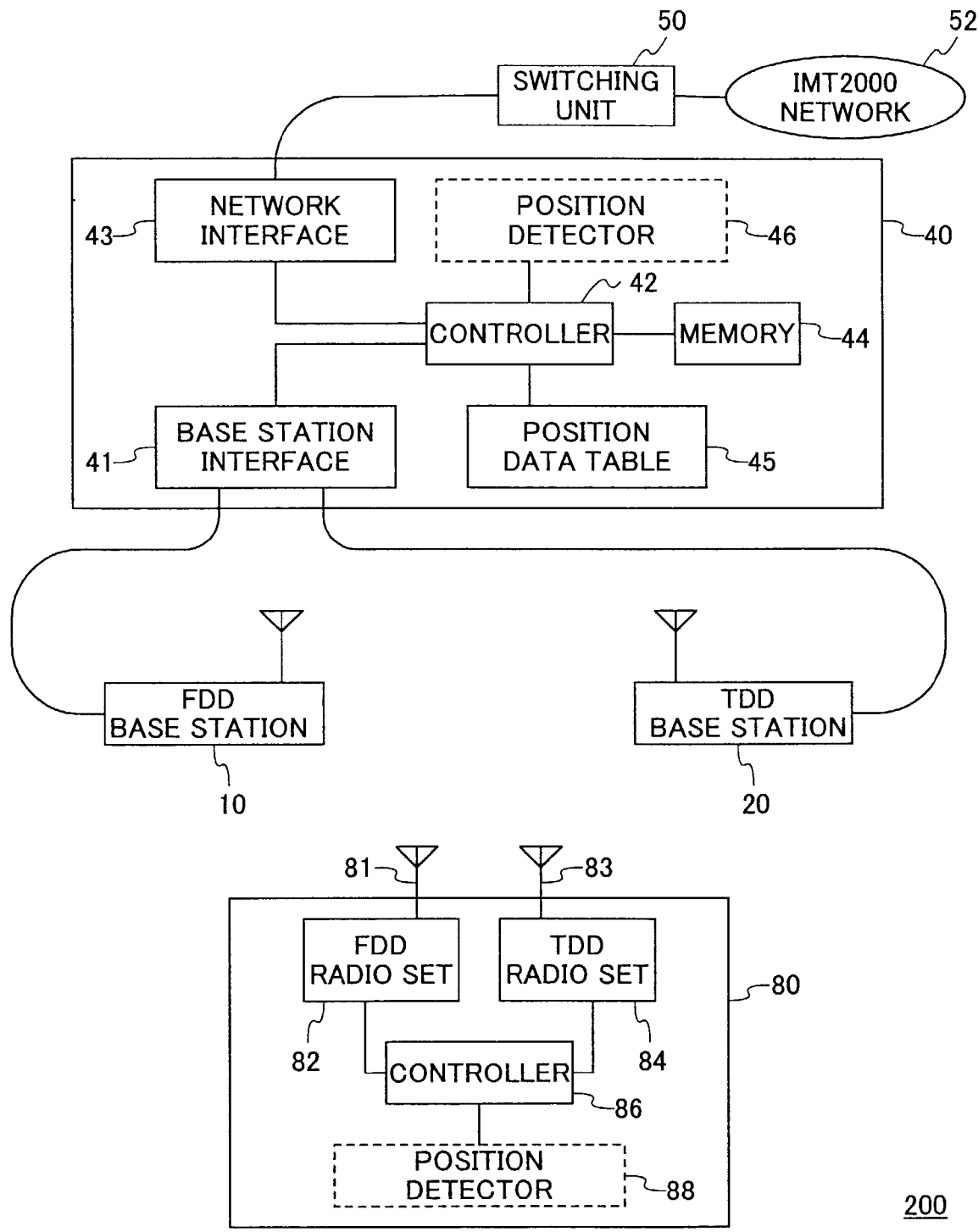
FIG. 3 is a schematic block diagram showing a configuration of the mobile communication system shown in FIG. 2.

FIG. 3 is a schematic block diagram showing a configuration of the mobile communication system 200 according to the first embodiment of the present invention.

As shown in FIG. 3, the mobile communication system 200 further includes a control unit 40 connected to the FDD base station 10 and the TDD base station 20 and for controlling operation of these base stations. Each FDD base station 10 and TDD base station 20 is connected to an IMT-2000 network 52 through control device 40 and a switching unit 50.

As shown in FIG. 3, the mobile terminal 80 is comprised of an FDD antenna 81 for receiving and transmitting radio signals by the FDD transmission method through radio links, an FDD radio set 82 connected to the antenna 81, a TDD antenna 83 for receiving and transmitting radio signals by the TDD transmission method through radio links, a TDD radio set 84 connected to the antenna 81, and a controller 86 connected to the FDD radio set 82 and the TDD radio set 84.

Controlled by the controller 86, the FDD radio set 82 performs necessary processing, such as receiving and transmitting, encoding and decoding, modulating and demodulating, interleaving and deinterleaving radio signals by means of FDD. Similarly, based on control of the controller 86, the TDD radio set 82 performs necessary processing, such as receiving and transmitting, encoding and decoding, modulating and demodulating, interleaving and deinterleaving radio signals by means of TDD.

Further, as an option, the mobile terminal 80 may also have a position detector 88. The position detector 88 may also be provided in the control unit 40. The position detector 88 is used to measure the position of the mobile terminal 80, for example, it may be a GPS (Global Positioning System) receiver for measuring positions. The position detector 88 computes the position (for example, latitude and longitude) of the mobile terminal 80 according to the propagation time and the angle of arrival of radio waves from a number of base stations. From the point of view of improving precision, it is preferable to use a GPS receiver, whereas from the point of view of simplicity, it is preferable to use measurement methods based on trigonometric relationships other than GPS.

As shown in FIG. 3, the control unit 40 is comprised of a base station interface 41 for relaying communications with the FDD base station 10 and the TDD base station 20, a controller 42 connected to the base station interface 41, a network interface 43 connected to the controller 42 and for relaying communications with the network 52 via the switching unit 50, a memory 44 connected to the controller 42 for storing the measured position data of the mobile terminal 80, a position data table 45 including data for selecting one of the FDD and the TDD according to the position of the mobile terminal 80.

Optionally, the control unit 40 may also have a position detector 46 for measuring the position of the mobile terminal 80. The same as the position detector 88 in the mobile terminal 80, the position detector 46 may be any device capable of measuring the position of the mobile terminal 80.

Figure 4:
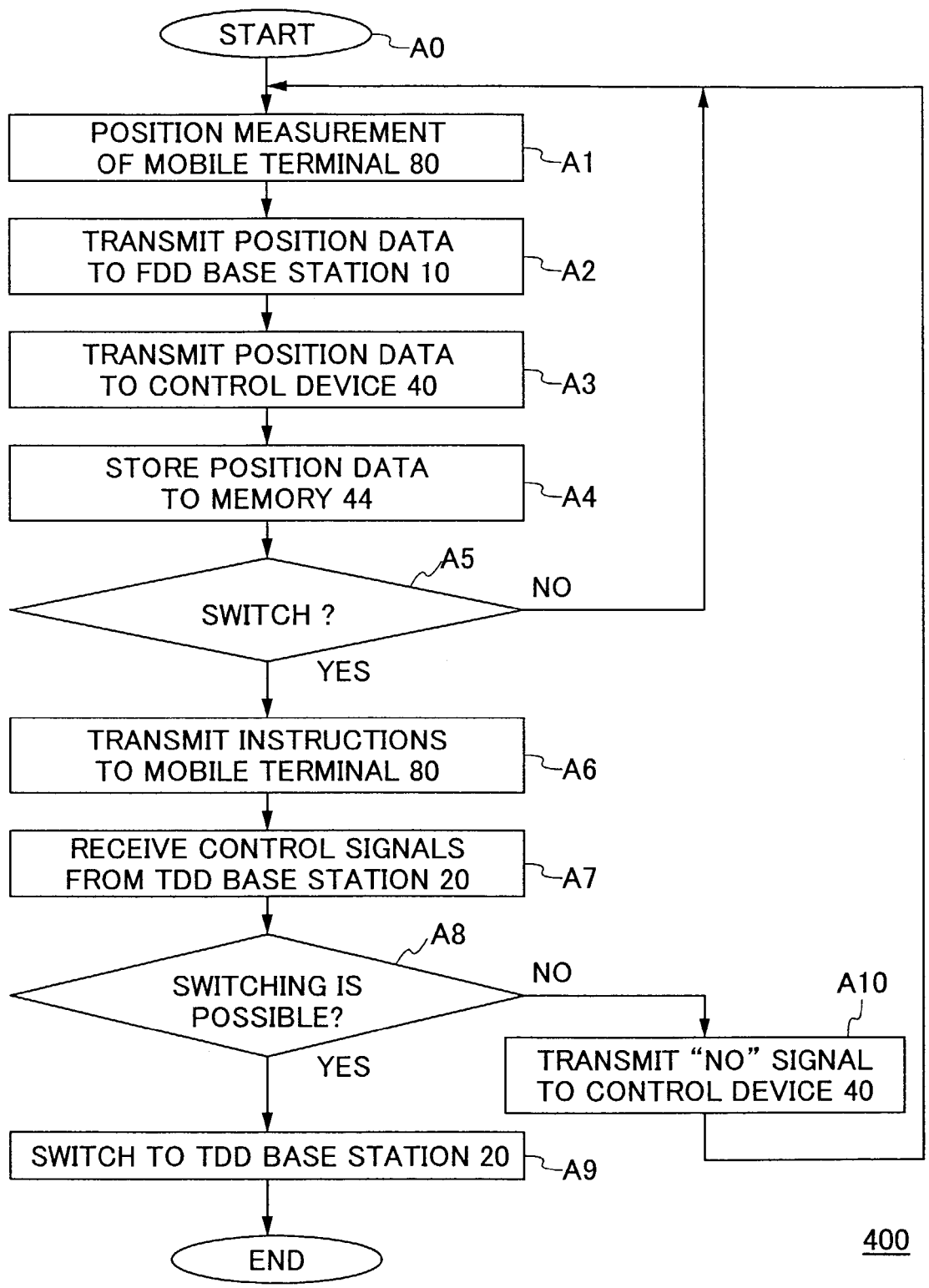
FIG. 4 is a flow chart showing handover between systems according to the first embodiment of the present invention.

FIG. 4 is a flow chart showing handover of the communication of the mobile terminal 80 between the above two systems in the mobile communication system 200. For the sake of convenience of explanation, it is assumed that the mobile terminal 80 is located in the area P2 in FIG. 2, and is communicating with the FDD base station 10 (step A0).

At the step A1, the mobile terminal 80 measures its own position. In this embodiment, it is assumed that the mobile terminal 80 is equipped with the position detector 88 and measures its position by itself.

As shown previously, in this position measurement, the position detector 88 may precisely deduce the latitude and longitude of the mobile terminal 80 by using a GPS receiver, or deduce the position of the mobile terminal 80 from the distances between base stations, using the propagation time and angle of arrival of radio waves from various base stations. Presently, because the mobile terminal 80 is located in the area P2, the base stations used in the position measurement are the FDD base stations 10, and the measurement is possible as long as the signals from the FDD base stations are receivable. This position measurement does cost much effort and electric power because the mobile terminal 80 is constantly communicating with the surrounding FDD base stations for handover between cells in the FDD service area 60. Furthermore, to measure the position of the mobile terminal 80, signals from the TDD base stations 20 are not necessary because the mobile terminal 80 is not communicating with them presently.

At step A2, the mobile terminal 80 transmits the measured value of its present position measured by the position detector 88 to the FDD station 10 via the FDD radio set 82 and the FDD antenna 81 under the control of the controller 86.

At step A3, the FDD base station transmits the received measurement value to the control unit 40.

At step A4, the control unit 40 receives the measured value of the present position of the mobile terminal 80, and stores the value as the present position in the memory 44. Note that stored in the memory 44 are not only the present measured position data of the mobile terminal 80, but also the previously measured position data.

At step A5, by using the table 45, the control unit 40 makes the determination whether or not to switch the present FDD communication of the mobile terminal 80 to the TDD communication.

FIG. 5 is an example of the position data table 45 in the control unit 40.

In the table 500 shown in FIG. 5, the letters A through D in the leftmost column are line indices, the second column from the left contains the previous positions of the mobile terminal 80, the third column from the left shows the present positions of the mobile terminal 80, the fourth column shows the present transmission method, and the rightmost column exhibits the contents of instructions. The positions and their changes of the mobile terminal 80 corresponding to lines A through D are indicated in FIG. 2 also by the letters A through D. For example, the case is considered in which the previous and present measured values of position of the mobile terminal 80 are both in the area P1, and the transmission method during the measurement of the present position is FDD. Making reference to the table 500 in FIG. 5, as it can be found, this situation corresponds to line B. So, as shown in the last column of the table 500, the conclusion is that the mobile terminal 40 should switch its communication to the TDD mode, and the control unit 40 should send such an instruction to the mobile terminal 40. As shown in FIG. 5 and FIG. 2, lines in the table 500 show the cases of being situated at the same positions in the area P1 previously and presently (line A and line B), moving from the area P2 to the area P1 (line C), and moving from the area P3 to the area P1 (line D).

The instructions provided in the table 500 show that the TDD transmission method is preferred in the area P1 because it is capable of high-speed communication. But as shown by line D, considering the position change of the mobile terminal 80, it is of a high probability that the mobile terminal 80 will move into the area P2 later, so transmission mode switching from TDD to FDD is directed. On the other hand, it may also be possible to direct that the FDD mode is preferred to the TDD mode in the area P1. Furthermore, from the point of view of carrying on the communications in safety, it may also be possible to direct to avoid switching the transmission mode. Note that the table 500 shows cases in which the present positions of the mobile terminal 80 are all in the area P1, but the present positions may also be in the areas P2 and P3. In the present embodiment, since the position change of the mobile terminal 80 is taken into consideration, various kinds of instructions can be defined, therefore, system switching can be appropriately performed according to the various actual situations.

Returning to FIG. 4, at step A5, by using the position information of the mobile terminal 80 and the table 45, the control unit 40 makes the determination whether or not to switch the present FDD communication of the mobile terminal 80 to the TDD communication. In detail, the controller 42 accesses the memory 44, and reads out the previous position data, the present position data (measured value), and the present transmission mode. Next, the controller 42 checks the previous position, the present position, and the present transmission mode of the mobile terminal 80 against the table 45, and decides the relevant line to find the instruction of the line.

In addition to the data of the present position, the mobile terminal 80 may also transmit to the control unit 40 a signal indicating the desire to switch or not to switch the transmission mode. For example, when communicating with the surrounding FDD base stations to measure the position, if the quality of the received signals (the level of a received signal) is lower than a preset value, the mobile terminal 80 may request to switch the transmission mode when sending signals of position data to the control unit 40. Furthermore, the mobile terminal 80 may also notify the control unit 40 that switching is not always necessary even if the signal quality becomes higher than the preset value. This measurement of quality of the received signal may also be performed at step A5, or at any time prior to step A5. In addition, the signal for showing the desire to switch or not switch may be transmitted to the control unit 40 at the time when transmitting the measured data of the position of the mobile terminal 80, or before transmitting the measured position data, as long as the transmission is after the measurement of the quality of the received signals. By doing this, the actual current situation at the mobile terminal 80 may be provided to the control unit 40, and the control of switching the transmission mode can be carried out appropriately and flexibly, reflecting the actual current situation of communication. In addition, not only can the determination be made from the location of the mobile terminal 80 and the present transmission mode, but the instruction can also be modified while considering the contents of the communication. For example, if speech is being transmitted at a lower data rate through the FDD base station 10, it is possible to specify to continue the FDD transmission but not to switch to the TDD mode. Similarly, if high-speed transmission is being conducted by the TDD method, it is possible to specify not to switch to the FDD transmission right after entering an area where switching to FDD is allowed, but to continue the TDD data transmission as long as possible.

At step A5, if the control unit 40 determines that switching of the transmission method is not necessary, for example, the situation shown by line A in the table 500 in FIG. 5, the routine returns to step A1 without switching the system. To the contrary, if the control unit 40 determines that the transmission method should be switched, for example, the situation shown by line C in the table 500, the routine proceeds to step A6.

At step A6, the control unit 40 issues instructions to the mobile terminal 80 to switch the transmission mode. For example, in the situation shown by line C in the table 500, the control unit 40 instructs the mobile terminal 80 to switch to the TDD transmission mode. The instruction is transmitted to the mobile terminal 80 through the base station interface 41 and the FDD base station 10 under the control of the controller 42. In the situation shown by line D in the table 500, the instructions is transmitted to the mobile terminal 80 through the base station interface 41 and the TDD base station 20.

At step A7, the mobile terminal 80 responds to the instructions for switching from the control unit 40, and starts the relevant procedures. For example, in the situation shown by the line C in the table 500, the mobile terminal 80 in communication with the FDD base station 20 receives the control signals from the TDD base station 20.

At step A8, it is determined whether the level of the received control signal is higher than a preset value, and if the resource for the TDD communication is granted, and so on, and a determination is made whether system switching is actually possible. Considering only the present position of the mobile terminal 80, it seems the transmission method should be switched, but sometimes sufficient signal levels cannot be obtained even if the mobile terminal 80 is located in a proper position, for example, proper communication becomes difficult because of the surrounding buildings. In addition, if the communication resource becomes insufficient for the TDD transmission mode, the resource may not be allocated to the mobile terminal 80.

If it is determined that switching is possible, the routine proceeds to step A9.

At step A9, the communication resource of TTD transmission mode is allocated to the mobile terminal 80, and the mobile terminal 80 starts to communicate by the TDD transmission method.

If it is determined that switching of the transmission method is not possible at step A8, the routine proceeds to step A10.

At step A10, the mobile terminal 80 sends a signal to the control unit 40 to report that the switching of the transmission method is not possible, then the routine returns to step A1.

In this way, the transmission modes are appropriately switched.

At step A11, the processing of system switching is finished.

In the present embodiment, although it is assumed that the mobile terminal 80 measures its position by itself, the control unit 40 may also do this measurement instead. In this case, the steps A1, A2 and A3 are replaced by a step in which the control unit 40 measures the position of the mobile terminal 80 using the position detector 46 as shown in FIG. 3. When the control unit 40 measures the position of the mobile terminal 80, work and power of the mobile terminal 80 for processing can be further saved. On the other hand, if the mobile terminal 80 measures its position by itself, system switching is still possible even if the base station 10 or 20 cannot measure the position of the mobile terminal 80. For example, this method can be utilized when the weather condition in the sky over the mobile terminal 80 is good, but the communication between the mobile terminal 80 and the base station is difficult, and a GPS receiver installed in the mobile terminal 80 is used to measure the position. Further, at step A6, an example is shown wherein the control unit 40 sends instructions for system switching, but in this case, it is also possible to send the instructions to the TDD base station 20, that is, the destination of the moving mobile terminal 80. From the point of view of performing the system switching more smoothly, it is preferable to send the instructions to both the mobile terminal 80 and the base station to be the destination.

The Second Embodiment

Figure 6:
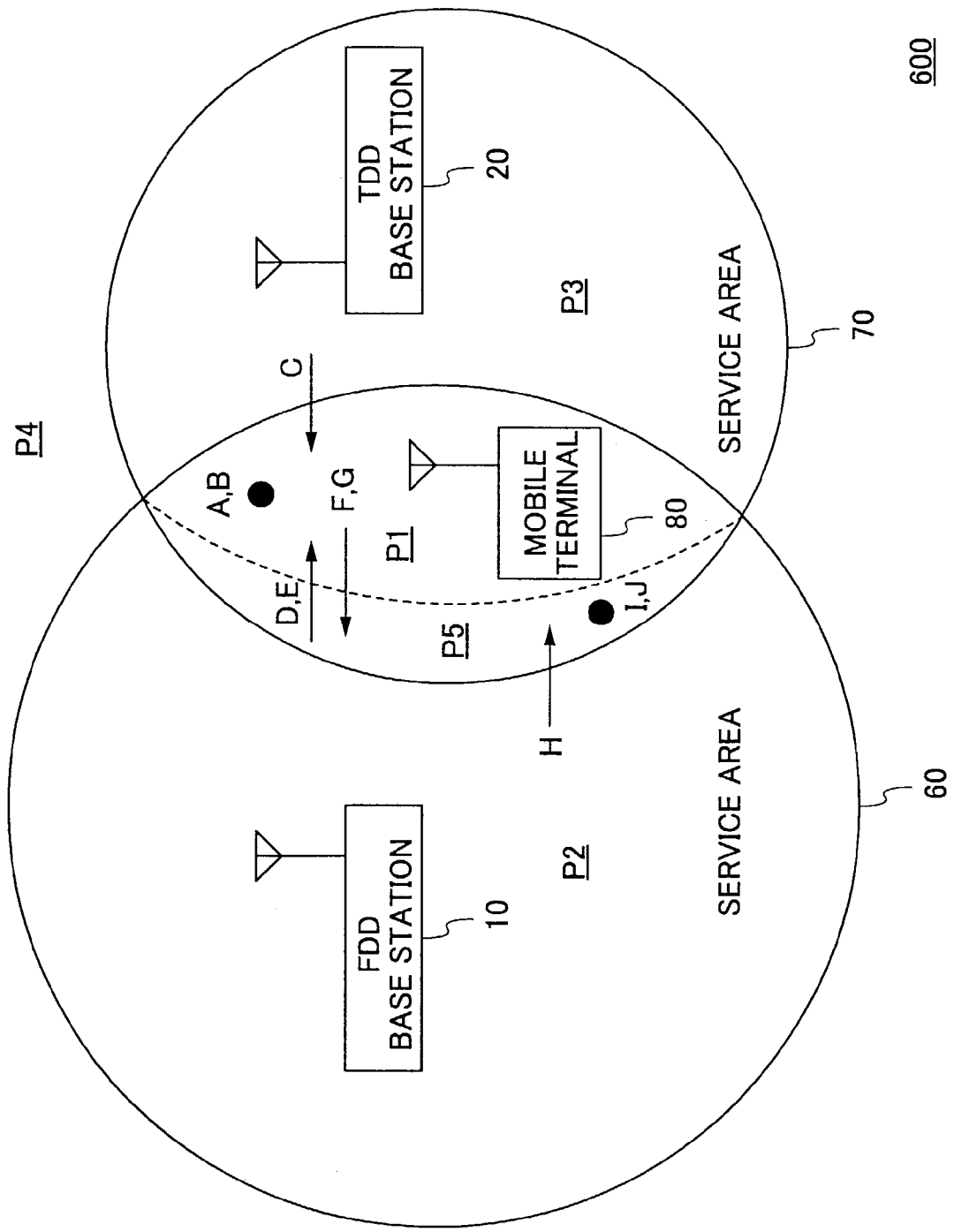
FIG. 6 is a schematic view showing a mobile communication system according to a second embodiment of the present invention.

FIG. 6 is a schematic view showing a mobile communication system 600 according to a second embodiment of the present invention. The basic configuration of the mobile communication system 600 is the same as that of the mobile communication system 200 shown in FIG. 2, except that the overlapped area of the FDD service area 60 and the TDD service area 70 are divided into the area P1 and the area P5.

FIG. 7 is an example of the position data table 45 in the control unit 40 in the mobile communication system 600.

The same as the table 500 shown in FIG. 5, in the table 700 shown in FIG. 7, the letters A through J in the leftmost column are line indices, the second column from the left contains the previous positions of the mobile terminal 80, the third column from the left shows the present positions of the mobile terminal 80, the fourth column shows the present transmission method, and the rightmost column exhibits the contents of instructions. The positions and their changes of the mobile terminal 80 corresponding to lines A through J are indicated in FIG. 6 also by the letters A through J.

As shown in FIG. 7 and FIG. 6, lines in the table 700 show the cases of being situated at the same positions in the area P1 previously and presently (line A and line B), moving from the area P3 to the area P1 (line C), moving from the area P5 to the area P1 (line D and line E), moving from the area P1 to the area P5 (line F and line G), moving from the area P2 to the area P5 (line H), and being situated at the same positions in the area P5 previously and presently (line I and line J).

The instructions provided in the table 700 show that the TDD transmission method is preferred because it is capable of high-speed communication. But as shown by line F and line G, considering the position change of the mobile terminal 80, there is a high probability that the mobile terminal 80 will move far away from the TDD service area 70, so transmission mode FDD is retained (line G) and switching from TDD to FDD is directed (line F). Further, as shown by the line A, I, and J, when the previous and present positions of the mobile terminal 80 are both in the same common area P1 or P5 of the service areas, it is directed to avoid switching. However, in the case shown by line B, considering the fact that the mobile terminal 80 is closer to the TDD base station 20 than the FDD base station 10, and the view that TDD mode should be used as much as possible, it is directed to use the TDD transmission method.

In this way, by utilizing not only the present position of the mobile terminal 80 but also the changes of a plurality of positions, and dividing the service area into smaller areas, for example, it is possible to continue to use the TDD transmission method as much as possible, and to reduce the number of switching of the transmission modes in consideration of the future movement of the mobile terminal 80 (as shown by lines F and G). Accordingly, it is possible to effectively control the switching.

Above, the case is described in which the TDD transmission method is preferably adopted. To the contrary, it is also possible to specify to preferably use the FDD transmission method. Further, from the point of view of carrying on the communications in safety, it may also be possible to direct to avoid switching the transmission mode. Furthermore, in the case as specified in the line H, it is practical not to switch to the TDD mode, because the mobile terminal 80 is close to the area P2, and will possibly move back to the area P2, although the TDD transmission mode is possible in the area P5. In other words, even if the mobile terminal 80 in one transmission mode is approaching a position where switching to the other transmission mode is possible, it is possible to specify not to start the switching procedure in a period in which the mobile terminal 80 may return to the current system. In the present embodiment, because the position change of the mobile terminal 80 is taken into consideration, various kinds of instructions can be defined. Furthermore, because the common area of the service areas is divided into the areas P1 and P5, it is possible to effect a more elaborate switching control suitable to the actual situations than the cases shown in FIG. 3 and FIG. 5. Therefore, it is possible to realize appropriate system switching control according to the various actual situations.

Note that the table 700 shows cases in which the present positions of the mobile terminal 80 are all in the area P1 or the area P5, but the present position may also be in the area P2 and P3. Further, it is possible to effect controls by using not only the position (coordinate) information but also velocity information of the mobile terminal 80. For example, from the point of view of reducing unnecessary switching, it can be directed not to start system switching, even though position change occurs between the present and the previous position, if the present speed is slower than a preset value. Further, it is also possible to define the instruction according to the contents of communications, for example, to specify to preferably use the FDD transmission in case of speech transmission, and preferably use the TDD transmission in case of data transmission, and so on. In the example shown in FIG. 3, the service areas are divided into four areas P1 through P4, in the example shown in FIG. 6, the service areas are divided into five areas P1 through P5. In principle, it is possible to divide the service areas into more small areas to elaborately specify the controls. The number of divisions is dependent on the precision of the position measurement and the capacity of the memory for the table 45. Further, in the descriptions so far, it is assumed that the contents of the table 45 are specified by the control unit 40 beforehand and cannot be modified, but it is possible to change the contents of the table 45, that is, the instructions for system switching, according to the requirements of the network. By making the contents of the table 45 dynamically modifiable, for example, it is possible to select a transmission method appropriate to the traffic situation, and increase the capacity of the system.

In the above embodiments, the control unit 40 for controlling the FDD base station 10 and the TDD base station 20 is shown as a control device provided to be independent of the network, and common to the two sub-systems (FIG. 2), but the present invention is not limited to this pattern. The functions equivalent to the control unit 40 may be implemented on the side of the network including the switching unit 50. Further, if the two sub-systems are specified to be able to communicate with each other, the functions equivalent to the control unit 40 may be included in one sub-system. If the functions of the control unit 40 are secured, the control unit 40 can be situated at any position regardless of its implementation, because it is adequate if it is possible to obtain the position data of the mobile terminal 80 and send instructions on system switching to the mobile terminal 80 and the base stations by making reference to the table 45.

In the above embodiments, a mobile communication system including an IMT-2000/FDD system and an IMT-2000/TDD system is used as an example. Because the present invention uses the position information of the mobile terminal instead of monitoring the level of signals from base stations not in communication, the present invention is applicable to any other combination of communication systems. Nevertheless, from the point of view of smooth and effective system switching, it is preferable that the two communication systems have the same the protocol layer. The IMT-2000/FDD system and the IMT-2000/TDD system have different physical layers (for example, the mobile link), but their upper layers are the same. This upper layer includes regulations (protocol) on receiving and transmission of control data related to the call connections, charging methods, position registration, data format in use and so on. Because the measured position of a mobile terminal is a quantity independent of the details of the physical layer, if the position is measured in one system, it is not necessary to measure it again in the other system. This point makes a large difference between the present invention and the related art in which the levels of the signals from the other system have to be constantly monitored. Accordingly, the present invention is of advantage to combinations of communication systems which have the same communication protocol upper layer of the physical layer.

The present invention is of advantage even to combinations of communication systems that have the same physical layers. Furthermore, the present invention is applicable to combinations of not only two communication systems but also three or more communication systems.

In the above embodiments, the function of the control device corresponds to the control unit 40 and part of the control function of the mobile terminal 80.

The position measuring unit corresponds to the position detector 46 in the control unit 40 or the position detector 88 in the mobile terminal 80.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the present invention, a mobile terminal communicating with one communication system can be switched to communicate with another system while reducing power consumption and workload of the mobile terminal.

This patent application is based on Japanese priority patent application No. 2002-086613 filed on Mar. 26, 2002, the entire contents of which are hereby incorporated by reference.

What is claimed is:

1. A control device of a communication system including a first base station and a second base station, wherein a separate mobile terminal is in communication with the first base station using a first transmission method, and able to communicate with the second base station using a second transmission method, the control device comprising:
   a position measuring unit configured to measure a geographic position of the mobile terminal;
   a judgment unit configured to determine whether or not to switch the communication of the mobile terminal from the first base station to the second base station according to a combination of a position of the mobile terminal measured by the position measuring unit, a position change of the mobile terminal, and at least contents of communications; and
   a switching unit configured to switch the communication of the mobile terminal from the first base station to the second base station according to the determination of the judgment unit,
   wherein a communication protocol upper layer of a physical layer of the first base station is at least partially the same as a communication protocol upper layer of a physical layer of the second base station.

2. The control device as claimed in claim 1, further comprising a position data table including data for selecting one of the first base station and the second base station according to the geographic position of the mobile terminal, wherein said judgment unit makes said determination by using the position data table.

3. The control device as claimed in claim 1, wherein the judgment unit is configured to determine whether or not to switch the communication of the mobile terminal from the first transmission method to the second transmission method according to a present position and a previous position of the mobile terminal, measured by the position measuring unit.

4. The control device as claimed in claim 1, wherein the first transmission method is one of a frequency division duplex transmission method and a time division duplex transmission method; and
   the second transmission method is the other one of the frequency division duplex transmission method and the time division duplex transmission method.

* * * * *